(12) United States Patent
Yamauchi et al.

(10) Patent No.: US 12,203,886 B2
(45) Date of Patent: Jan. 21, 2025

(54) ION ANALYZER

(71) Applicant: SHIMADZU CORPORATION, Kyoto (JP)

(72) Inventors: Shosei Yamauchi, Kyoto (JP); Masaji Furuta, Kyoto (JP); Kosuke Hosoi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 298 days.

(21) Appl. No.: 17/600,489

(22) PCT Filed: May 15, 2019

(86) PCT No.: PCT/JP2019/019345
§ 371 (c)(1),
(2) Date: Sep. 30, 2021

(87) PCT Pub. No.: WO2020/230297
PCT Pub. Date: Nov. 19, 2020

(65) Prior Publication Data
US 2022/0214307 A1    Jul. 7, 2022

(51) Int. Cl.
*G01N 27/64*    (2006.01)
*H01J 49/16*    (2006.01)
*H01J 49/24*    (2006.01)

(52) U.S. Cl.
CPC ............ *G01N 27/64* (2013.01); *H01J 49/164* (2013.01); *H01J 49/24* (2013.01)

(58) Field of Classification Search
CPC ........ G01N 27/64; H01J 49/164; H01J 49/24; H01J 49/005
See application file for complete search history.

(56) References Cited

U.S. PATENT DOCUMENTS 4,239,967 A * 12/1980 Carr ...................... G01N 27/623
250/281
4,999,493 A * 3/1991 Allen .................... H01J 49/044
250/288
(Continued)

FOREIGN PATENT DOCUMENTS

DE    19523860 A1    1/1997
JP    10-228881 A    8/1998
(Continued)

OTHER PUBLICATIONS

International Search Report for PCT/JP2019/019345 dated Aug. 6, 2019 (PCT/ISA/210).
(Continued)

*Primary Examiner* — Jeff W Natalini
(74) *Attorney, Agent, or Firm* — Sughrue Mion, PLLC

(57) ABSTRACT

An ion analyzer 1 includes: an ionization chamber 10; an ionization unit 3 configured to generate ions from a sample 11 in the ionization chamber 10; an analysis chamber 20 separated from the ionization chamber 10 by a partition wall 21 in which an opening 211 is formed; an ion transport unit 22, 23, and 24 provided in the analysis chamber 20 and configured to transport the ions generated in the ionization unit; an ion trapping unit 25 provided in the analysis chamber 20 and configured to trap the ions transported by the ion transport unit 22, 23, and 24; an ion detection unit 26 provided in the analysis chamber 20 and configured to detect the ions released from the ion trapping unit 25; and a single evacuation mechanism 28 connected only to the analysis chamber 20 and configured to evacuate the analysis chamber 20 to a pressure of $10^{-3}$ Pa or less.

5 Claims, 1 Drawing Sheet

(56) References Cited

U.S. PATENT DOCUMENTS

| | | | |
|---|---|---|---|
| 5,859,433 A | 1/1999 | Franzen | |
| 6,060,706 A | 5/2000 | Nabeshima et al. | |
| 9,184,037 B2* | 11/2015 | Kumano | H01J 49/0495 |
| 2002/0036263 A1 | 3/2002 | Shiokawa et al. | |
| 2009/0026362 A1* | 1/2009 | Arii | H01J 49/147 |
| | | | 250/281 |
| 2010/0270465 A1* | 10/2010 | Raptakis | H01J 49/0481 |
| | | | 250/281 |
| 2014/0250977 A1* | 9/2014 | Spencer | H01J 49/24 |
| | | | 73/23.37 |
| 2016/0233050 A1* | 8/2016 | Kasuya | H01J 41/20 |
| 2016/0247669 A1* | 8/2016 | Tateishi | H01J 49/067 |
| 2017/0168030 A1* | 6/2017 | Mensa | G01N 30/722 |
| 2019/0279857 A1 | 9/2019 | Kodera et al. | |
| 2019/0333748 A1* | 10/2019 | Takahashi | H01J 49/06 |
| 2020/0161118 A1 | 5/2020 | Kudo | |
| 2022/0130652 A1* | 4/2022 | Murata | G01N 27/62 |

FOREIGN PATENT DOCUMENTS

| | | |
|---|---|---|
| JP | 2001-273869 A | 10/2001 |
| JP | 2016-115565 A | 6/2016 |
| WO | 2018/092271 A1 | 5/2018 |
| WO | 2019/016854 A1 | 1/2019 |

OTHER PUBLICATIONS

Written Opinion for PCT/JP2019/019345 dated Aug. 6, 2019 (PCT/ISA/237).
Office Action issued Dec. 9, 2022 in German Application No. 112019007323.0.
German Office Action dated Apr. 20, 2023 in German Application No. 112019007323.0.
Chinese Office Action dated Jan. 29, 2024 in Application No. 201980095834.6.

* cited by examiner

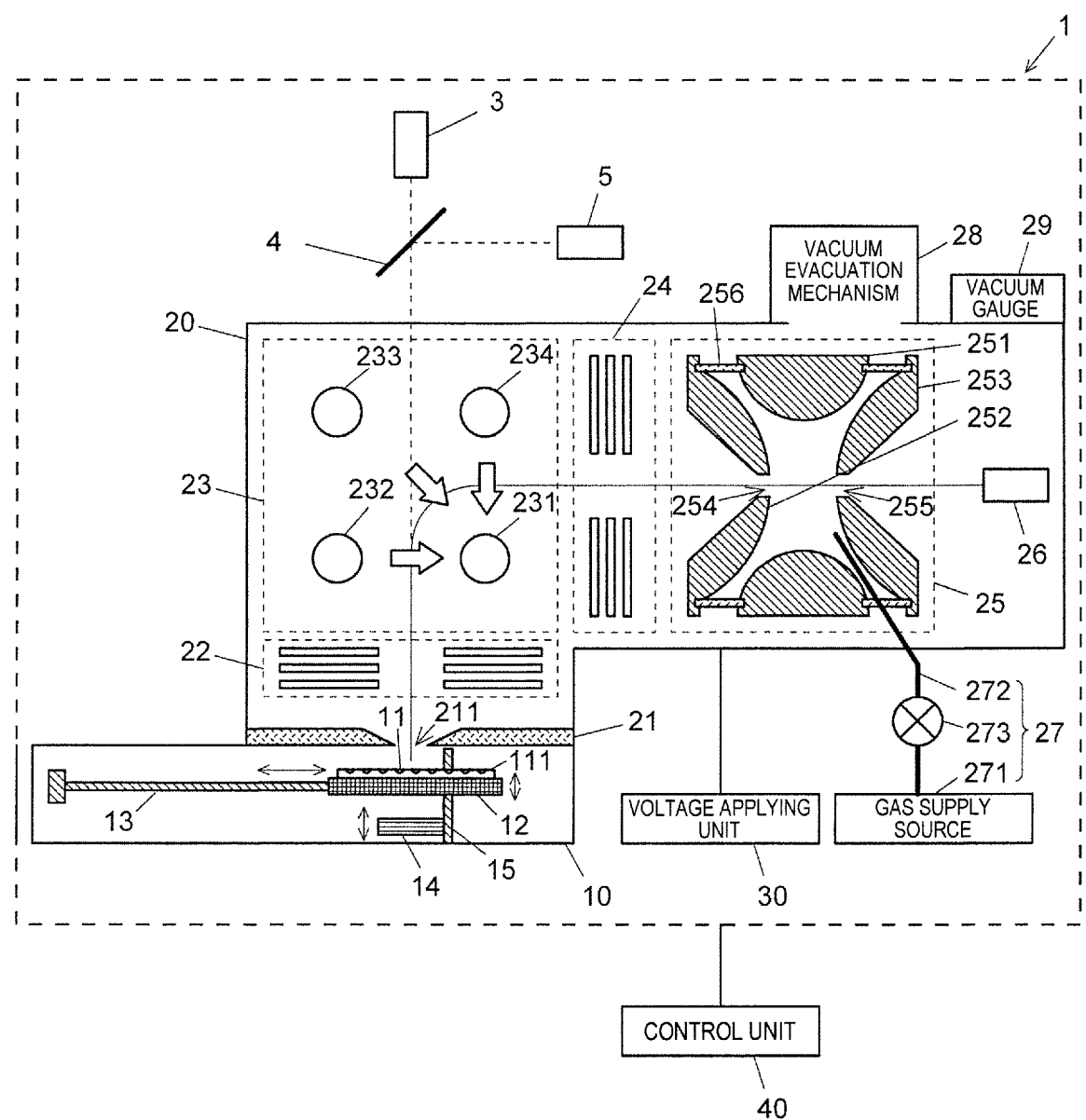

ION ANALYZER

CROSS REFERENCE TO RELATED APPLICATIONS

This application is a National Stage of International Application No. PCT/JP2019/019345 filed May 15, 2019.

TECHNICAL FIELD

The present invention relates to an ion analyzer.

BACKGROUND ART

One of methods for ionizing a sample that are used in a mass spectrometer is a matrix assisted laser desorption/ionization (MALDI) method (Patent Literatures 1 to 3). In the matrix assisted laser desorption/ionization method, a substance (matrix material) that easily absorbs laser light and is easily ionized is applied to a surface of a sample, so that the matrix material incorporates sample molecules. Then, the matrix material incorporating the sample molecules are microcrystallized, and laser light is irradiated on the matrix material to ionize the sample molecules. The ions generated from the sample molecules are provided to an ion analyzer for mass spectrometry, ion mobility analysis, or the like. An ion source that generates ions by the MALDI method is called a MALDI ion source, and a mass spectrometer including a MALDI ion source is called a matrix assisted laser desorption/ionization mass spectrometer (MALDI-MS).

As the MALDI ion source, in many cases, a vacuum MALDI ion source is used in which sample molecules are ionized in the vacuum atmosphere. Ions generated by the vacuum MALDI ion source in an ionization chamber are introduced into a mass spectrometry chamber, which is communicated with the ionization chamber through an ion introduction port. The mass spectrometry chamber is provided with an ion transport optical system constituted by an ion lens and the like, an ion trap, and an ion detection unit. The ions introduced through the ion introduction port are converged by the ion transport optical system and introduced into the ion trap. A radio-frequency voltage for trapping ions is applied to the ion trap. A cooling gas such as helium gas is introduced into the ion trap, and the ions are cooled by collision with the cooling gas and trapped in the vicinity of the center in the ion trap. After that, the ions are serially released from the ion trap and detected by the ion detection unit.

In the above MALDI-MS, the ion transport optical system and the ion detection unit need to have a pressure (high vacuum) of $10^{-3}$ Pa or less. Therefore, the ion transport optical system and the ion detection unit are evacuated by a turbo-molecular pump. On the other hand, the vacuum MALDI ion source needs to have a degree of vacuum of 10-1 to 10-2 Pa. However, the ionization chamber, in which the ion source is provided, is also evacuated by a turbomolecular pump in order not to degrade the vacuum of the ion transport optical system connected to the ionization chamber. When the cooling gas is introduced into the ion trap, the degree of vacuum in the ion trap temporarily becomes $10^{-1}$ to $10^{-2}$ Pa. Therefore, in the mass spectrometry chamber, a space in which the ion trap is located and a space containing the ion transport optical system and the ion detection unit are separated with a partition wall, and each of the spaces is evacuated by the turbo-molecular pump, in order not to degrade the degree of vacuum of the space containing the ion transport optical system and the ion detection unit due to an inflow of the cooling gas from the ion trap.

CITATION LIST

Patent Literature

Patent Literature 1: JP H10-228881 A
Patent Literature 2: WO 2018/092271 A
Patent Literature 3: JP 2016-115565 A

SUMMARY OF INVENTION

Technical Problem

As described above, in the conventional MALDI-MS, it is necessary to use a plurality of turbo-molecular pumps in order to evacuate a plurality of spaces required to have different degree of vacuums, and there is a problem that the device is accordingly large and expensive.

The MALDI-MS has been described here as an example, but the same problem as described above lies with a device using a vacuum ionization source other than the MALDI ion source and with a device that performs mobility analysis of ions trapped in an ion trap.

An object of the present invention is to achieve downsizing and cost reduction of an ion analyzer in which ions derived from a sample and generated in a vacuum ion source are trapped in an ion trapping unit and then analyzed.

Solution to Problem

An ion analyzer according to the present invention made to solve the above problem includes:
an ionization chamber;
an ionization unit configured to generate ions from a sample in the ionization chamber;
an analysis chamber separated from the ionization chamber by a partition wall in which an opening is formed;
an ion transport unit provided in the analysis chamber and configured to transport the ions generated in the ionization unit;
an ion trapping unit provided in the analysis chamber and configured to trap the ions transported by the ion transport unit;
an ion detection unit provided in the analysis chamber and configured to detect the ions released from the ion trapping unit; and
a single evacuation mechanism connected only to the analysis chamber and configured to evacuate the analysis chamber to a pressure of $10^{-3}$ Pa or less.

Advantageous Effects of Invention

In an ion analyzer, an ion transport unit and an ion detection unit are generally required to have a high degree of vacuum (to have a low pressure) with a pressure of $10^{-3}$ Pa or less. On the other hand, the degree of vacuum required for an ion source disposed in an ionization chamber is about $10^{-1}$ to $10^{-2}$ Pa, which is lower than the degree of vacuum required for the ion transport unit and the ion detection unit. Therefore, in the ion analyzer according to the present invention, a single evacuation mechanism that evacuates the space to which the evacuation mechanism is connected to the pressure of $10^{-3}$ Pa or less is connected only to the analysis chamber to directly evacuate the analysis chamber, and at the same time, to also evacuate the ionization chamber indirectly through the opening. After the analysis chamber and the ionization chamber are each evacuated to a predetermined degree of vacuum, the ionization unit is operated to generate ions from a sample. At the same time as or slightly later than the generation of ions from the sample, a predetermined gas (cooling gas) is introduced into the ion trapping unit. The ions introduced into the ion trapping unit are cooled by collision with the cooling gas, and are trapped near the center of the ion trapping unit. The cooling gas introduced into the ion trapping unit gradually flows out to the analysis chamber, so that the degree of vacuum in the analysis chamber decreases. Therefore, the ions are trapped in the ion trapping unit until the gas is evacuated by the evacuation mechanism and the degree of vacuum in the analysis chamber reaches a predetermined degree of vacuum. Then, after the degree of vacuum in the analysis chamber reaches the predetermined degree of vacuum, the ions are sequentially released from the ion trapping unit and are detected by the ion detection unit.

The single evacuation mechanism is composed of, for example, a main pump such as a turbo-molecular pump for high vacuum pumping and an auxiliary pump such as a diaphragm pump for rough pumping. The main pump that performs high vacuum pumping is generally large and expensive. Since the ion analyzer according to the present invention includes only a single evacuation mechanism connected only to the analysis chamber, it is possible to achieve downsizing and cost reduction compared with a conventional ion analyzer including a plurality of such evacuation mechanisms. Note that the expression "single evacuation mechanism" is a limitation related to the main pump (that is, the evacuation mechanism that evacuates the space to which the evacuation mechanism is connected to a pressure of $10^{-3}$ Pa or less), and does not exclude a form in which, for example, a roughing pump is connected to the ionization chamber where a load lock operation is performed.

BRIEF DESCRIPTION OF DRAWINGS

FIG. 1 is a configuration diagram of a main part of a mass spectrometer as an embodiment of an ion analyzer according to the present invention.

DESCRIPTION OF EMBODIMENTS

A mass spectrometer that is an embodiment of an ion analyzer according to the present invention will be described below with reference to the drawings. The mass spectrometer of the present embodiment is a matrix laser desorption/ionization-ion trap (MALDI-IT) mass spectrometer that causes an ion trap (IT) to mass-separate ions generated by a matrix-assisted laser desorption/ionization (MALDI) ion source.

FIG. 1 shows a configuration of a main part of a mass spectrometer 1 of the present embodiment. The mass spectrometer 1 is roughly configured with an ionization chamber 10, a mass spectrometry chamber 20, a voltage applying unit 30, and a control unit 40. A partition wall 21 is provided between the ionization chamber 10 and the mass spectrometry chamber 20. The partition wall 21 is provided with an opening 211 in a tapered shape that is gradually wider toward the mass spectrometry chamber 20 side.

The ionization chamber 10 is provided with a sample stage 12 on which there is placed a sample plate 111 having a plurality of wells for accommodating a sample 11. There is also provided a stage moving mechanism 13 to move the sample stage 12 between a measurement position (position shown in FIG. 1) and a replacement position and to move the sample stage 12 close to and away from the opening 211 at the measurement position. There are also provided a valve 14 and a valve moving mechanism 15 for moving the valve 14 between a closing position (position shown in FIG. 1) at which the valve closes the opening 211 and a retraction position. The valve 14 and the valve moving mechanism 15 constitute a load lock mechanism. The ionization chamber 10 is further provided with a mechanism (not shown in the drawing) for an analyst to open and close the ionization chamber 10 to replace the sample plate 11. Other than the above, the ionization chamber 10 is provided with a diaphragm pump (roughing pump, not shown in the drawing) that evacuates the ionization chamber 10 to a pressure of about $10^3$ Pa when a load lock operation is performed. In the present embodiment, a diaphragm pump is connected to the ionization chamber 10; however, such a configuration including a roughing pump is a preferable aspect but is not essential to the present invention.

Outside the ionization chamber 10 and the mass spectrometry chamber 20, there are disposed: a laser light source 3 that applies laser light to the sample 11 on the sample stage 12 at the measurement position; and a camera 5 that observes a surface of the sample via a half mirror 4.

The mass spectrometry chamber 20 is provided with a first ion lens 22, a deflection unit 23, a second ion lens 24, an ion trap 25, and an ion detector 26 in this order from the side closer to the ionization chamber 10. The first ion lens 22 and the second ion lens 24 are each configured with a plurality of annular electrodes arranged along a central axis (ion optical axis) of a flight path of ions.

The deflection unit 23 includes four rod electrodes 231 to 234. Under control of the control unit 40, the voltage applying unit 30 applies a voltage of the opposite polarity to the ions to the rod electrode 231 and a voltage of the same polarity as the ions to each of the other rod electrodes 232 to 234.

The ion trap 25 is a three-dimensional ion trap including an annular ring electrode 251 in an annular shape and a pair of end cap electrodes (inlet-side end cap electrode 252 and outlet-side end cap electrode 253) disposed to be opposite to each other with the ring electrode 251 interposed between the pair of endcap electrodes. An ion introduction hole 254 is formed in the inlet-side end cap electrode 252, and an ion ejection hole 255 is formed in the outlet-side end cap electrode 253. Under control of the control unit 40, the voltage applying unit 30 applies either a radio-frequency voltage or a direct-current voltage or a combined voltage of the both to each of the electrodes 251, 252, and 253 at a predetermined timing. By appropriately changing these voltages, ions are trapped inside the ion trap 25, and the trapped ions are released. The ions released from the ion trap 25 are detected by the ion detector 26.

The inlet-side end cap electrode 252 and the ring electrode 251 are fixedly coupled to each other with an insulating member 251, and the outlet-side end cap electrode 253 and the ring electrode 251 are fixedly coupled to each other with an annular insulating member 256. The insulating members 256 are each provided with a plurality of (for example, four) openings at equal intervals in a circumferential direction, so that an internal space of the ion trap 25 and the mass spectrometry chamber 20 communicate with each other through the openings. The openings of the insulating members 256 are formed sufficiently larger than the ion introduction hole 254 of the inlet-side end cap electrode 252 and the ion ejection hole 255 of the outlet-side end cap electrode 253.

To the ion trap 25 there is attached a gas supply unit 27 that supplies one or more inert gases (helium, nitrogen, argon, and the like) at a predetermined flow rate into the ion trap 25. The gas supply unit 27 includes: a gas supply source 271 of a plurality of types gases that are selectively fed; a gas passage 272 connecting the gas supply source 271 and the ion trap 25; and a valve 273 provided on the gas passage 272.

A vacuum evacuation mechanism 28 is connected to a chamber wall surface constituting the mass spectrometry chamber 20 at a position facing the ion trap 25 and the ion detector 26. The vacuum evacuation mechanism 28 includes a turbo-molecular pump as a main pump, and a diaphragm pump as an auxiliary pump. In the vicinity of the ion detector 26 in the mass spectrometry chamber 20, there is attached a vacuum gauge 29 for measuring a pressure in the mass spectrometry chamber 20.

Next, a measurement flow using the mass spectrometer of the present embodiment will be described.

First, cause the valve moving mechanism 15 in the ionization chamber 10 to operate so as to close the opening 211 with the valve 14. Next, open the ionization chamber 10, cause the stage moving mechanism 13 to operate so as to move the sample stage 12 to the replacement position, and place sample plate 111 on the sample stage 12. During the series of operations, an inside of the ionization chamber 10 is opened to the atmosphere. After that, close the ionization chamber 10, cause the diaphragm pump to rough pump the ionization chamber 10, and at the same time, cause the stage moving mechanism 13 to operate so as to move the sample stage 12 to the measurement position.

After the sample stage 12 is moved to the measurement position, when a user instructs to start measurement, the control unit 40 operates the above units as follows.

First, the valve moving mechanism 15 operates so as to cause the valve 14 to open the opening 211. Subsequently, the diaphragm pump, which is the auxiliary pump of the vacuum evacuation mechanism 28, operates to rough pump the inside of the mass spectrometry chamber 20. In addition, the inside of the ionization chamber 10 is also rough pumped through the opening 211. As a result, the mass spectrometry chamber 20 and the ionization chamber 10 are rough pumped to about $10^{-1}$ to $10^{-2}$ Pa. Then, the turbo-molecular pump, which is the main pump, operates to high vacuum pump the inside of the mass spectrometry chamber 20. At this time, the inside of the ionization chamber 10 is also vacuum pumped through the opening 211. Since the ionization chamber 10 is evacuated through the opening 211, the degree of vacuum does not necessarily reach the same degree of vacuum as in the mass spectrometry chamber 20. However, the degree of vacuum required to generate ions from the sample 11 in the ionization chamber 10 is about $10^{-1}$ to $10^{-2}$ Pa, and there is no particular problem even when the ionization chamber 10 is at about a degree of vacuum achieved by rough pumping. After that, the vacuum evacuation mechanism 28 continues vacuum pumping of the mass spectrometry chamber 20 until the measurement is completed.

After the pressure in the mass spectrometry chamber 20 becomes $10^{-3}$ Pa or less, the laser light source 3 operate to apply laser light to a surface of the sample 11 on the sample stage 12 at the measurement position. The application of laser generates ions from the sample 11. The ions generated from the sample 11 are drawn, through the opening 211, into the mass spectrometry chamber 20 having a higher degree of vacuum than the ionization chamber 10. The ions drawn into the mass spectrometry chamber 20 are converged by the first ion lens 22, and a flight direction of the ions is deflected by the deflection unit 23. The ions are further converged by the second ion lens 24, and then enter the ion trap 25 through the ion introduction hole 254 of the inlet-side end cap electrode 252. A previously determined radio-frequency voltage (or a voltage obtained by superposing a radio-frequency voltage and a direct-current voltage) is applied to each of the ring electrode 251, the inlet-side end cap electrode 252, and the outlet-side end cap electrode 253, whereby ions having a predetermined mass-to-charge ratio (or mass-to-charge ratio range) are trapped in the ion trap 25.

Helium gas is introduced into the ion trap 25 from the gas supply unit 27 for a predetermined time period, simultaneously with the application of the laser light to the sample 11 or slightly later than the application of the laser light to the sample 11. The helium gas is used as a cooling gas. Due to collision between the ions and the helium gas, a kinetic energy of the ions trapped in the ion trap 25 decreases. Then, these ions are gradually cooled and converged in the vicinity of a center of the ion trap 25.

The helium gas introduced into the ion trap 25 flows out from the openings of the insulating members 256 into the mass spectrometry chamber 20. The degree of vacuum in the mass spectrometry chamber 20 therefore decreases temporarily. Therefore, the degree of vacuum in the mass spectrometry chamber 20 is waited to become more than or equal to that at the start of measurement (until the pressure becomes $10^{-3}$ Pa or less). In the meantime, the ions cooled by the cooling gas are kept trapped inside the ion trap 25.

After the pressure in the mass spectrometry chamber 20 become $10^{-3}$ Pa or less, the applied voltages to the ring electrode 251, the inlet-side end cap electrode 252, and the outlet-side end cap electrode 253 are appropriately changed so as to change the mass-to-charge ratio (or mass-to-charge ratio range) of the ions trapped in the ion trap 25, so that the ions having a specific mass-to-charge ratio (or mass-to-charge ratio range) are released from the ion trap 25 and are detected by the ion detector 26.

The above description is about an example in which the ions generated from a sample are measured as they are, but it is possible to perform a tandem mass spectrometry (MS/MS) measurement or a multi stage mass spectrometry (MS") measurement in which the ions generated from a sample are cleaved and measured a plurality of times. In this case, after the ions are cooled with helium gas, precursor ions are selected by applying the radio-frequency voltages (or the voltage obtained by superposing a radio-frequency voltage and a direct-current voltage) that trap only the ions having a predetermined mass-to-charge ratio in the ion trap 25, to the ring electrode 251, the inlet-side end cap electrode 252, and the outlet-side end cap electrode 253. After that, a collision gas (for example, nitrogen gas or argon gas) is introduced into the ion trap 25 from the gas supply unit 27. Further, the precursor ions trapped in the ion trap 25 are excited and cleaved by collision with the collision gas to generate product ions.

Then, it is waited that the cooling gas and the collision gas having flown out to the mass spectrometry chamber 20 through the openings of the insulating members 256 are evacuated by the vacuum evacuation mechanism 28 and that the degree of vacuum in the mass spectrometry chamber 20 becomes $10^{-3}$ Pa or higher degree of vacuum, which is equivalent to the degree of vacuum at the start of measurement. In the meantime, the product ions are trapped inside the ion trap 25.

After the pressure in the mass spectrometry chamber 20 has becomes $10^{-3}$ Pa or less, the voltages applied to the ring electrode 251, the inlet-side end cap electrode 252, and the outlet-side end cap electrode 253 are appropriately changed, and the ions trapped in the ion trap 25 are released and detected by the ion detector 26.

As described above, in the mass spectrometer 1 of the present embodiment, only a single vacuum evacuation mechanism 28 evacuates each of the ionization chamber 10 and the mass spectrometry chamber 20 to a required degree of vacuum. Therefore, it is possible to manufacture a mass spectrometer at a smaller size and at a lower cost as compared with a conventional mass spectrometer using a vacuum evacuation mechanism for each of spaces having different required degrees of vacuum.

As described above, a high degree of vacuum is required for the mass spectrometry chamber 20, and once the mass spectrometry chamber 20 is opened to the atmosphere, it takes time to vacuum pump. Therefore, as described in the above embodiment, in the case where the configuration includes the load lock mechanism that opens the ionization chamber 10 to the atmosphere at the time of setting the sample, only the ionization chamber 20 is opened to the atmosphere to set the sample in a state where the opening 211 of the mass spectrometry chamber 20 is closed by the valve 14 and the inside of the mass spectrometry chamber 10 is maintained in vacuum.

When the ionization chamber 10 is opened to the atmosphere, water vapor contained in the atmosphere also enters the ionization chamber 10 and adheres to a wall surface and the like. Once water molecules adhere to the wall surface and the like in the ionization chamber 10, the water molecules are not easily separated but gradually separated. Until the water molecules are completely separated from the wall surface and the like, it is difficult to make the degree of vacuum higher than a certain constant pressure even if the vacuum pumping is continued. Since the degree of vacuum required for the ionization chamber 10 is not so high, the water molecules are not a problem. However, when water molecules separated from the wall surface and the like of the ionization chamber 10 enter the inside of the mass spectrometry chamber 20 through the opening 211, the degree of vacuum in the mass spectrometry chamber 20 becomes deteriorated. The pressure of the mass spectrometry chamber 20 is required to be $10^{-3}$ Pa or less, and if the opening 211 has too large a diameter, the amount of water molecules entering the mass spectrometry chamber 20 from the ionization chamber 10 is larger than the amount of water molecules exhausted by the vacuum evacuation mechanism 28 (in particular, turbo-molecular pump), so that the required degree of vacuum cannot be obtained. Therefore, it is necessary to determine the diameter of the opening 211 so that the inflow speed (inflow amount) of water molecules from the ionization chamber 10 to the mass spectrometry chamber 20 becomes equal to or less than the evacuation speed (exhaust amount) by the turbo-molecular pump. An example of how to determine the diameter of the opening 211 will be described below.

Suppose that the pressure in the mass spectrometry chamber 20 is $P_1$ (Pa), the pressure in the ionization chamber 10 is $P_2$ (Pa), and the diameter of the opening 211 is D (m). Since a molecular velocity (flow velocity) at room temperature (20° C.) of water molecules ($H_2O$) flying in a vacuum atmosphere like in the ionization chamber 10 and the mass spectrometry chamber 20 in the present embodiment is about 600 m/s, a model is constructed in which water molecules enter the mass spectrometry chamber 20 from the ionization chamber 10 through the opening 211 having an area of $\pi/4 \times D^2$ (m$^2$) at a velocity of 600 (m/s).

An intrusion volume (a volume, in the ionization chamber 10, of water molecules entering the mass spectrometry chamber 20 per second) $V_2$ (m$^3$/s) of water molecules into the mass spectrometry chamber 20 is $\pi/4 \times D^2$ (m$^2$)×600 (m/s)=150$\pi D^2$ (m$^3$/s). When ambient temperature of the mass spectrometer 1 is constant, the variables R and T in the gas state equation PV=nRT are constant. Since the number n of molecules of water molecules is unchanged between at the time of passing through the opening 211 and after entering the mass spectrometry chamber 20, the value on the right side is constant, and therefore the PV on the left side is also constant.

The value of $P_2V_2$ of water molecules moving from the ionization chamber 10 to the mass spectrometry chamber 20 is $P_2V_2=P_2\times150\pi D^2$. In addition, since the evacuation speed $V_1$ of a general turbo-molecular pump is about 30 L/s=30× $10^{-3}$ (m$^3$/s) or more, the value of $P_1V_1$ of the water molecules exhausted from the mass spectrometry chamber 20 by the turbo-molecular pump is $P_1V_1=P_1\times30\times10^{-3}$ (m$^3$/s)=30× $10^{-3}\times P_1$.

Here, in the case of $P_2V_2>P_1V_1$, the amount of water molecules entering the mass spectrometry chamber 20 from the ionization chamber 10 is larger than the amount of water molecules exhausted from the mass spectrometry chamber 20, so that the degree of vacuum in the mass spectrometry chamber 20 becomes deteriorated. Therefore, it is necessary to determine the diameter D of the opening so as to satisfy a relationship $P_2V_2 \leq P_1V_1$. That is, from a conditional expression $P_2\times150\pi D^2 \leq 30\times10^{-3}\times P_1$, following Mathematical Expression 1 is obtained.

$$D \leq \sqrt{\frac{10^{-3}}{5\pi} \times \frac{P_1}{P_2}} \qquad \text{[Mathematical expression 1]}$$

Therefore, by substituting, on the basis of the configuration of the mass spectrometer actually used for measurement, an assumed pressure of the ionization chamber 10 and a pressure required for the mass spectrometry chamber 20 into above Mathematical Expression 1, the diameter D of the opening suitable for the configuration of the mass spectrometer can be determined.

The inventors of the present invention set various diameters of the opening 211 and measured the pressure in the mass spectrometry chamber 20 with respect to the various diameters while exhausting the mass spectrometry chamber 20 with the turbo-molecular pump, and found that when the diameter of the opening 211 is 6.0 mm or less, the required degree of vacuum (pressure of $10^{-3}$ Pa or less) can be obtained.

When the above model and the actual measurement results are summarized, it can be said that when the diameter of the opening 211 is 6.0 mm or less in the mass spectrometer having a general configuration, there is no problem in practical use (in other words, the degree of vacuum in the mass spectrometry chamber 20 does not become worse than $10^{-3}$ Pa) and that the mass spectrometry chamber 20 can be maintained at ultra-high vacuum also by setting the diameter of the opening 211 to be less than or equal to the value obtained by substituting the pressure and the like assumed in the mass spectrometer to be actually used into above Mathematical Expression 1.

The above embodiment is merely an example and can be appropriately modified without departing from the spirit of the present invention.

The above embodiment is a MALDI-IT type mass spectrometer, but a mass spectrometer including an ionization source other than the MALDI or a mass separation unit other than the IT can have the same configuration as described above. In addition, not only the mass spectrometer but also an ion mobility analyzer and the like can adopt the same configuration as described above.

Various embodiments of the present invention have been described in detail with reference to the drawing, and lastly, various aspects of the present invention will be described.

An ion analyzer of a first aspect of the present invention includes:

- an ionization chamber;
- an ionization unit configured to generate ions from a sample in the ionization chamber;
- an analysis chamber separated from the ionization chamber by a partition wall in which an opening is formed;
- an ion transport unit provided in the analysis chamber and configured to transport the ions generated in the ionization unit;
- an ion trapping unit provided in the analysis chamber and configured to trap the ions transported by the ion transport unit;
- an ion detection unit provided in the analysis chamber and configured to detect the ions released from the ion trapping unit; and
- a single evacuation mechanism connected only to the analysis chamber and configured to evacuate the analysis chamber to a pressure of $10^{-3}$ Pa or less.

In the ion analyzer of the first aspect of the present invention, the analysis chamber is directly exhausted by a single evacuation mechanism that is connected only to the analysis chamber and is configured to evacuate the space to which the evacuation mechanism is connected to the pressure of $10^{-3}$ Pa or less, and at the same time, to also evacuate the ionization chamber indirectly through the opening. After the analysis chamber and the ionization chamber are each evacuated to a predetermined degree of vacuum, the ionization unit is operated to generate ions from a sample. At the same time as or slightly later than the generation of ions from the sample, a predetermined gas (cooling gas) is introduced into the ion trapping unit. The ions introduced into the ion trapping unit are cooled by collision with the cooling gas, and are trapped near the center of the ion trapping unit. The cooling gas introduced into the ion trapping unit gradually flows out to the analysis chamber, so that the degree of vacuum in the analysis chamber decreases. Therefore, the ions are trapped in the ion trapping unit until the gas is exhausted by an evacuation mechanism and the degree of vacuum in the mass spectrometry chamber reaches a predetermined degree of vacuum. Then, after the degree of vacuum in the mass spectrometry chamber reaches the predetermined degree of vacuum, the ions are sequentially released from the ion trapping unit and are detected by the ion detection unit.

The above single evacuation mechanism includes, for example, a main pump such as a turbo-molecular pump for high vacuum pumping and an auxiliary pump such as a diaphragm pump for rough pumping. The main pump that performs high vacuum pumping is generally large and expensive. Since the ion analyzer according to the present invention includes only a single evacuation mechanism connected only to the analysis chamber, it is possible to achieve downsizing and cost reduction compared with a conventional ion analyzer including a plurality of such evacuation mechanisms.

An ion analyzer of a second aspect includes, in the ion analyzer of the first aspect, a valve configured to open and close the opening, the valve being provided in the ionization chamber.

In the ion analyzer of the second aspect, it is possible to replace the sample without releasing the mass spectrometry chamber to the atmosphere, by causing the valve to close the opening.

Regarding an ion analyzer of a third aspect of the present invention, in the ion analyzer of the above first or second aspect, the opening has a diameter of 6.0 mm or less.

In the ion analyzer of the third aspect, since the diameter of the opening is 6.0 mm or less, the amount of water molecules that can enter the mass spectrometry chamber from the ionization chamber is suppressed, and the mass spectrometry chamber can therefore be reliably maintained at ultrahigh vacuum. Although the opening is assumed to be circular in this aspect, the shape of the opening is not limited to a circular shape, and it is possible to use an opening having an appropriate shape having an area equal to or less than the area of a circular shape having a diameter of 6.0 mm.

An ion analyzer of a fourth aspect of the present invention further includes, in the ion analyzer of any one of the first to third aspects:

- a gas introduction unit configured to introduce a predetermined gas into the ion trapping unit; and
- a control unit configured: to cause the ionization unit to operate and generate the ions from the sample, and in addition, to cause the gas introduction unit to operate for a predetermined time period; to trap the ions in the ion trapping unit until a degree of vacuum in the analysis chamber reaches a predetermined degree of vacuum; and then to release the ions from the ion trapping unit to detect the ions by the ion detection unit.

By using the ion analyzer of the fourth aspect, it is possible to analyze ions, without bothering an analyst, at an appropriate timing when the ion analysis chamber reaches a predetermined degree of vacuum.

Regarding an ion analyzer of a fifth aspect of the present invention, in the ion analyzer of any one of the first to fourth aspects, the ion trapping unit is an ion trap.

In the ion analyzer of the fifth aspect, since the ion trap can function as both the ion trapping unit and the mass separation unit, the device can be downsized.

REFERENCE SIGNS LIST

1 . . . Mass Spectrometer
3 . . . Laser Light Source
4 . . . Half Mirror
5 . . . Camera
10 . . . Ionization Chamber
11 . . . Sample
111 . . . Sample Plate
12 . . . Sample Stage
13 . . . Stage Moving Mechanism
14 . . . Valve
15 . . . Valve Moving Mechanism
20 . . . Mass Spectrometry Chamber
21 . . . Partition Wall
211 . . . Opening 22 . . . First Ion Lens
23 . . . Deflection Unit
231 to 234 . . . Rod Electrode
24 . . . Second Ion Lens
25 . . . Ion Trap
251 . . . Ring Electrode
252 . . . Inlet-side End Cap Electrode
253 . . . Outlet-side End Cap Electrode
254 . . . Ion Introduction Hole
255 . . . Ion Ejection Hole
256 . . . Insulating Member
26 . . . Ion Detector
27 . . . Gas Supply Unit
271 . . . Gas Supply Source
272 . . . Gas Passage
273 . . . Valve
28 . . . Vacuum Evacuation Mechanism
29 . . . Vacuum Gauge
30 . . . Voltage Applying Unit
40 . . . Control Unit

The invention claimed is:

1. An ion analyzer comprising:
an ionization chamber;
an ionization unit configured to generate ions from a sample in the ionization chamber;
an ionization chamber opening mechanism configured to open and close the ionization chamber to an external atmospheric space;
an analysis chamber separated from the ionization chamber by a partition wall in which an opening is formed;
a load lock mechanism configured to open and close the opening;
an ion transport unit provided in the analysis chamber and configured to transport the ions generated by the ionization unit;
an ion trapping unit provided in the analysis chamber and configured to trap the ions transported by the ion transport unit;
an ion detection unit provided in the analysis chamber and configured to detect the ions released from the ion trapping unit;
a single evacuation mechanism connected only to the analysis chamber and configured to evacuate the analysis chamber to a pressure of $10^{-3}$ Pa or less;
a gas introduction unit configured to introduce a predetermined gas into the ion trapping unit; and
a control unit configured:
to cause the ionization unit to generate ions from the sample,
to cause the gas introduction unit to operate for a predetermined time period;
to trap the ions in the ion trapping unit until a degree of vacuum in the ion analysis chamber reaches a predetermined level; and then
to release the ions from the ion trapping unit such that the ions are detected by the ion detection unit.

2. The ion analyzer according to claim 1, further comprising a valve configured to open and close the opening, the valve being provided in the ionization chamber.

3. The ion analyzer according to claim 1, wherein the opening has a diameter of 6 mm or less.

4. The ion analyzer according to claim 1, wherein the ion trapping unit is a three-dimensional ion trap.

5. The ion analyzer according to claim 1, wherein the single evacuation mechanism is further configured to evacuate the ionization chamber to a pressure of $10^{-1}$ to $10^{-2}$ Pa indirectly through the opening.

* * * * *